United States Patent
Chandrasekaran et al.

(10) Patent No.: US 10,467,103 B1
(45) Date of Patent: Nov. 5, 2019

(54) EFFICIENT CHANGE BLOCK TRAINING

(71) Applicant: Nutanix, Inc., San Jose, CA (US)

(72) Inventors: Karthik Chandrasekaran, Bangalore (IN); Parthasarathy Ramachandran, Palo Alto, CA (US)

(73) Assignee: Nutanix, Inc., San Jose, CA (US)

( * ) Notice: Subject to any disclaimer, the term of this patent is extended or adjusted under 35 U.S.C. 154(b) by 251 days.

(21) Appl. No.: 15/081,489

(22) Filed: Mar. 25, 2016

(51) Int. Cl.
*G06F 11/14* (2006.01)

(52) U.S. Cl.
CPC ...... *G06F 11/1451* (2013.01); *G06F 2201/84* (2013.01)

(58) Field of Classification Search
CPC combination set(s) only.
See application file for complete search history.

(56) References Cited

U.S. PATENT DOCUMENTS

| | | |
|---|---|---|
| 5,812,793 A * | 9/1998 | Shakib .............. H04L 29/06 707/999.008 |
| 6,834,386 B1 | 12/2004 | Douceur et al. |
| 7,035,881 B2 | 4/2006 | Tummala et al. |
| 7,039,661 B1 * | 5/2006 | Ranade ............. G06F 17/30575 707/610 |
| 7,360,034 B1 | 4/2008 | Muhlestein et al. |
| 8,099,572 B1 | 1/2012 | Arora et al. |
| 8,194,674 B1 | 6/2012 | Pagel et al. |
| 8,407,265 B1 | 3/2013 | Scheer et al. |
| 8,413,146 B1 | 4/2013 | McCorkendale et al. |
| 8,539,484 B1 | 9/2013 | Offer |
| 8,549,518 B1 | 10/2013 | Aron et al. |
| 8,566,821 B2 | 10/2013 | Robinson et al. |
| 8,601,473 B1 | 12/2013 | Aron et al. |
| 8,683,153 B1 | 3/2014 | Long et al. |
| 8,838,542 B1 * | 9/2014 | Chester ............. G06F 17/30233 707/640 |
| 8,850,130 B1 | 9/2014 | Aron et al. |
| 8,910,156 B1 | 12/2014 | Kenchammana-Hosekote et al. |
| 9,772,866 B1 | 9/2017 | Aron et al. |
| 2002/0002448 A1 | 1/2002 | Kampe |
| 2002/0161889 A1 | 10/2002 | Gamache et al. |

(Continued)

OTHER PUBLICATIONS

Non-final Office Action dated Dec. 26, 2012 for U.S. Appl. No. 13/207,365.

(Continued)

*Primary Examiner* — Etienne P Leroux
(74) *Attorney, Agent, or Firm* — Vista IP Law Group, LLP

(57) ABSTRACT

Snapshot data (e.g., changed blocks) resulting from operation of applications is captured in two forms: (1) in a bitmap that indicates if one or more blocks in a range of blocks has changed, and (2) as the changed block data itself. The changed blocks are sent to a remote disaster recovery location only once per snapshot period. Even through a particular block might have been changed many times during a snapshot period, only the last version of the changed block is sent to the remote disaster recovery location. The fact that a block has been changed can be parsimoniously managed by determining an address space for the source data, dividing the address space into a plurality of ranges, and indicating which blocks if any in a particular range have been changed. Such modification indicators are sent to the disaster recovery location only once per snapshot period.

20 Claims, 13 Drawing Sheets

(56) References Cited

U.S. PATENT DOCUMENTS

| | | | |
|---|---|---|---|
| 2002/0184239 A1 | 12/2002 | Mosher et al. | |
| 2003/0046369 A1 | 3/2003 | Sim et al. | |
| 2003/0202486 A1 | 10/2003 | Anton et al. | |
| 2004/0139128 A1 | 7/2004 | Becker et al. | |
| 2004/0221089 A1 | 11/2004 | Sato et al. | |
| 2005/0065985 A1 | 3/2005 | Tummala et al. | |
| 2005/0102672 A1 | 5/2005 | Brothers | |
| 2006/0005189 A1 | 1/2006 | Vega et al. | |
| 2006/0047928 A1* | 3/2006 | Bhasin | G06F 11/2074 711/162 |
| 2006/0112093 A1 | 5/2006 | Lightstone et al. | |
| 2006/0123062 A1 | 6/2006 | Bobbitt et al. | |
| 2006/0126918 A1 | 6/2006 | Oohashi et al. | |
| 2007/0156955 A1 | 7/2007 | Royer, Jr. et al. | |
| 2007/0239942 A1 | 10/2007 | Rajwar et al. | |
| 2007/0244938 A1 | 10/2007 | Michael et al. | |
| 2008/0183973 A1 | 7/2008 | Aguilera et al. | |
| 2008/0196043 A1 | 8/2008 | Feinleib et al. | |
| 2008/0244028 A1 | 10/2008 | Le et al. | |
| 2008/0263407 A1 | 10/2008 | Yamamoto | |
| 2008/0270564 A1 | 10/2008 | Rangegowda et al. | |
| 2008/0282047 A1 | 11/2008 | Arakawa et al. | |
| 2009/0172660 A1 | 7/2009 | Klotz et al. | |
| 2009/0222542 A1 | 9/2009 | Miyajima | |
| 2009/0259759 A1 | 10/2009 | Miyajima | |
| 2009/0300660 A1 | 12/2009 | Solomon et al. | |
| 2009/0313391 A1 | 12/2009 | Watanabe | |
| 2010/0037243 A1 | 2/2010 | Mo et al. | |
| 2010/0070470 A1 | 3/2010 | Milencovici et al. | |
| 2010/0070725 A1 | 3/2010 | Prahlad et al. | |
| 2010/0115174 A1 | 5/2010 | Akyol et al. | |
| 2010/0138827 A1 | 6/2010 | Frank et al. | |
| 2010/0161908 A1 | 6/2010 | Nation et al. | |
| 2010/0162039 A1 | 6/2010 | Goroff et al. | |
| 2010/0174820 A1 | 7/2010 | Banga et al. | |
| 2010/0251238 A1 | 9/2010 | Schuba et al. | |
| 2010/0262586 A1 | 10/2010 | Rosikiewicz et al. | |
| 2010/0274768 A1* | 10/2010 | Wang | G06F 16/27 707/676 |
| 2010/0275198 A1 | 10/2010 | Jess et al. | |
| 2010/0281166 A1 | 11/2010 | Buyya et al. | |
| 2010/0332889 A1 | 12/2010 | Shneorson et al. | |
| 2011/0010515 A1 | 1/2011 | Ranade | |
| 2011/0032261 A1* | 2/2011 | Jeddeloh | G06F 12/0284 345/532 |
| 2011/0061050 A1 | 3/2011 | Sahita et al. | |
| 2011/0071983 A1 | 3/2011 | Murase | |
| 2011/0088027 A1* | 4/2011 | Jelvis | G06F 9/4411 717/174 |
| 2011/0145534 A1 | 6/2011 | Factor et al. | |
| 2011/0145916 A1 | 6/2011 | McKenzie et al. | |
| 2011/0154318 A1 | 6/2011 | Oshins et al. | |
| 2011/0167489 A1* | 7/2011 | Ziv | G06F 12/1466 726/19 |
| 2011/0184993 A1 | 7/2011 | Chawla et al. | |
| 2011/0185292 A1 | 7/2011 | Chawala et al. | |
| 2011/0202920 A1 | 8/2011 | Takase | |
| 2011/0208909 A1 | 8/2011 | Kawaguchi | |
| 2011/0239213 A1 | 9/2011 | Aswani et al. | |
| 2011/0245724 A1 | 10/2011 | Flatland et al. | |
| 2011/0258404 A1 | 10/2011 | Arakawa et al. | |
| 2011/0314469 A1 | 12/2011 | Qian et al. | |
| 2011/0320556 A1 | 12/2011 | Reuther | |
| 2012/0002535 A1 | 1/2012 | Droux et al. | |
| 2012/0005307 A1 | 1/2012 | Das et al. | |
| 2012/0011505 A1 | 1/2012 | Fujisaki et al. | |
| 2012/0030676 A1 | 2/2012 | Smith et al. | |
| 2012/0036134 A1 | 2/2012 | Malakhov | |
| 2012/0054746 A1 | 3/2012 | Vaghani | |
| 2012/0079229 A1 | 3/2012 | Jensen et al. | |
| 2012/0084445 A1 | 4/2012 | Brock et al. | |
| 2012/0096461 A1 | 4/2012 | Goswami et al. | |
| 2012/0102006 A1 | 4/2012 | Larson et al. | |
| 2012/0102491 A1 | 4/2012 | Maharana | |
| 2012/0137098 A1 | 5/2012 | Wang et al. | |
| 2012/0144229 A1 | 6/2012 | Nadolski | |
| 2012/0158659 A1* | 6/2012 | Marathe | G06F 17/30997 707/639 |
| 2012/0158674 A1 | 6/2012 | Lillibridge | |
| 2012/0167079 A1 | 6/2012 | Banerjee et al. | |
| 2012/0167082 A1 | 6/2012 | Kumar et al. | |
| 2012/0167085 A1 | 6/2012 | Subramaniyan et al. | |
| 2012/0179874 A1 | 7/2012 | Chang et al. | |
| 2012/0221529 A1 | 8/2012 | Rosikiewicz et al. | |
| 2012/0254862 A1 | 10/2012 | Dong | |
| 2012/0266165 A1 | 10/2012 | Cen et al. | |
| 2012/0272240 A1 | 10/2012 | Starks et al. | |
| 2012/0284712 A1 | 11/2012 | Nimmagadda et al. | |
| 2013/0007219 A1 | 1/2013 | Sorenson et al. | |
| 2013/0013865 A1 | 1/2013 | Venkatesh | |
| 2013/0014103 A1 | 1/2013 | Reuther et al. | |
| 2013/0055259 A1 | 2/2013 | Dong | |
| 2013/0061014 A1 | 3/2013 | Prahlad et al. | |
| 2013/0097397 A1* | 4/2013 | Sundrani | G06F 11/1461 711/162 |
| 2014/0095438 A1* | 4/2014 | Marwah | G06F 17/30073 707/639 |
| 2014/0324945 A1* | 10/2014 | Novak | H04L 29/0854 709/203 |
| 2015/0046686 A1* | 2/2015 | Abdallah | G06F 9/3863 712/220 |
| 2015/0149605 A1* | 5/2015 | de la Iglesia | H04L 67/322 709/223 |
| 2015/0269032 A1* | 9/2015 | Muthyala | G06F 16/116 707/639 |
| 2016/0210306 A1* | 7/2016 | Kumarasamy | G06F 17/30174 |

OTHER PUBLICATIONS

Non-final Office Action dated Jan. 24, 2013 for U.S. Appl. No. 13/207,371.

Thekkath et al., "Frangipani: A Scalable Distributed File System", SOSP, 1997, 24 pages.

Mendel Rosenblum, "The Design and Implementation of a Log-structured File System", SOSP, 1991, 101 pages.

Birrell et al., "A Simple and Efficient Implementation for Small Databases", Aug. 11, 1987, 17 pages.

Terry et al., "Managing Update Conflicts in Bayou, a Weakly Connected Replicated Storage System", Association for Computing Machinery, 1995, 12 pages.

Mike Burrows, "The Chubby lock service for loosely-coupled distributed systems", OSDI 2006 Paper, Google Inc., Sep. 6, 2006, 23 pages.

Lee et al., "Petal: Distributed Virtual Disks" The Proceedings of the 7th International Conference on Architectural Support for Programming Languages and Operating Systems, 1996, 9 pages.

Dean et al., "MapReduce: Simplified Data Processing on Large Clusters", OSDI 2004, 6th Symposium on Operating Systems Design and Implementation, Google Inc, Oct. 3, 2004, 25 pages.

Chang et al., "Bigtable: A Distributed Storage System for Structured Data" OSDI 2006 Paper, 7th USENIX Symposium on Operating Systems Design and Implementation, 2006, 20 pages.

Ghemawat et al., "The Google File System", SOSP 2003, ACM, Bolton Landing, NY, 2003, 15 pages.

Zhu et al., "Avoiding the Disk Bottleneck in the Data Domain Deduplication File System", Data Domain, Inc., 2008, 15 pages.

DeCandia et al., "Dynamo: Amazon's Highly Available Key-value Store", Proceedings of the 21st ACM Symposium on Operating Systems Principles, Oct. 2007, 16 pages.

"Project Voldemort, A distributed database, Jan. 9, 2013 url: http://www.project-voldemort.com/voldemort/".

Bernstein et al., "Concurrency Control and Recovery in Database Systems", Addison-Wesley 1987, 35 pages.

Weikum et al., "Transactional Information Systems: Theory, Algorithms, and the Practice of Concurrency Control and Recovery", 2002, 91 pages.

Timothy L. Harris, "A Pragmatic Implementation of Non-Blocking Linked-Lists", 2001, 15 pages.

(56) References Cited

OTHER PUBLICATIONS

Lakshman et al., "Cassandra—A Decentralized Structured Storage System", LADIS, 2009, 6 pages.
"Open iSCSI", Project: Open-iSCSI-RFC3720 architecture and implementation, 2005 url: http://www.open-iscsi.org.
"Chunkfs, Aug. 22, 2009 url: http://valerieaurora.org/chunkfs/".
"Hypertable", Hypertable Inc., Oct. 28, 2012 url: http://hypertable.org/.
MacCormick et al., "Boxwood: Abstractions as the Foundation for Storage Infrastructure" OSDI 2004, Microsoft Research Silicon Valley, 31 pages.
Robert Hagmann, "Reimplementing the Cedar File System Using Logging and Group Commit", ACM, 1987, 8 pages.
Sherman et al., "ACMS: The Akamai Configuration Management System" NSDI, 2005, 22 pages.
Petersen et al., "Flexible Update Propagation for Weakly Consistent Replication", SOSP, 1997, 19 pages.
Banga et al., "Resource containers: A new facility for resource management in server systems" Proceedings of the 3rd USENIX Symposium on ODSI, 1999, 15 pages.
F. Mattern, "Virtual Time and Global States of Distributed Systems" Proceedings of the International Workshop on Parallel and Distributed Algorithms, 1989, 15 pages.
Maged M. Michael, "High Performance Dynamic Lock-Free Hash Tables and List-Based Sets" SPAA 2002, Aug. 2002, 10 pages.
Welsh et al., "SEDA: An Architecuture for Well-Conditioned, Scalable Internet Services" Proceedings of the Eighteenth Symposium on Operating Systems Principles, Oct. 2001, 15 pages.
Notice of Allowance and Fees Due dated Apr. 8, 2013 for U.S. Appl. No. 13/207,365.
Non-final Office Action dated Apr. 11, 2013 for U.S. Appl. No. 13/207,345.
Final Office Action dated Jun. 27, 2013 for U.S. Appl. No. 13/207,371.
Notice of Allowance and Fees Due dated Aug. 23, 2013 for U.S. Appl. No. 13/207,345.
Non-final Office Action dated Jan. 27, 2014 for U.S. Appl. No. 13/571,188.
Non-final Office Action dated Apr. 24, 2014, for U.S. Appl. No. 13/744,655.
Notice of Allowance and Fees Due dated May 23, 2014 for U.S. Appl. No. 13/207,357.
Non-Final Office Action dated May 16, 2014 for U.S. Appl. No. 13/744,649.
Notice of Allowance dated Jun. 11, 2014 for U.S. Appl. No. 13/571,188.
Non-final Office Action dated Aug. 26, 2014 for U.S. Appl. No. 13/744,668.
Corrected Notice of Allowance dated Sep. 5, 2014 for U.S. Appl. No. 13/207,357.
Non-final Office Action dated Sep. 26, 2014 for U.S. Appl. No. 13/947,668.
Non-final Office Action dated Oct. 2, 2014 for U.S. Appl. No. 13/564,511.
Non-final Office Action dated Oct. 16, 2014 for U.S. Appl. No. 13/744,683.
Final Office Action dated Nov. 3, 2014, for U.S. Appl. No. 13/744,649.
Final Office Action dated Nov. 3, 2014, for U.S. Appl. No. 13/744,655.
Non-final Office Action dated Nov. 6, 2014, for U.S. Appl. No. 13/744,693.
Notice of Allowance and Fees Due dated Nov. 21, 2014, for U.S. Appl. No. 13/744,703.
Notice of Allowance and fees Due dated Dec. 1, 2014 for U.S. Appl. No. 13/207,371.
Final Office Action dated Jan. 30, 2015 for U.S. Appl. No. 13/564,511.
Notice of Allowance and Fee(s) Due dated Feb. 6, 2015 for U.S. Appl. No. 13/744,683.
Final Office Action dated Feb. 12, 2015 for U.S. Appl. No. 13/744,668.
Non-final Office Action dated Feb. 23, 2015 for U.S. Appl. No. 13/744,649.
Non-final Office Action dated Feb. 24, 2015 for U.S. Appl. No. 13/830,116.
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), https://nutanix.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.

\* cited by examiner

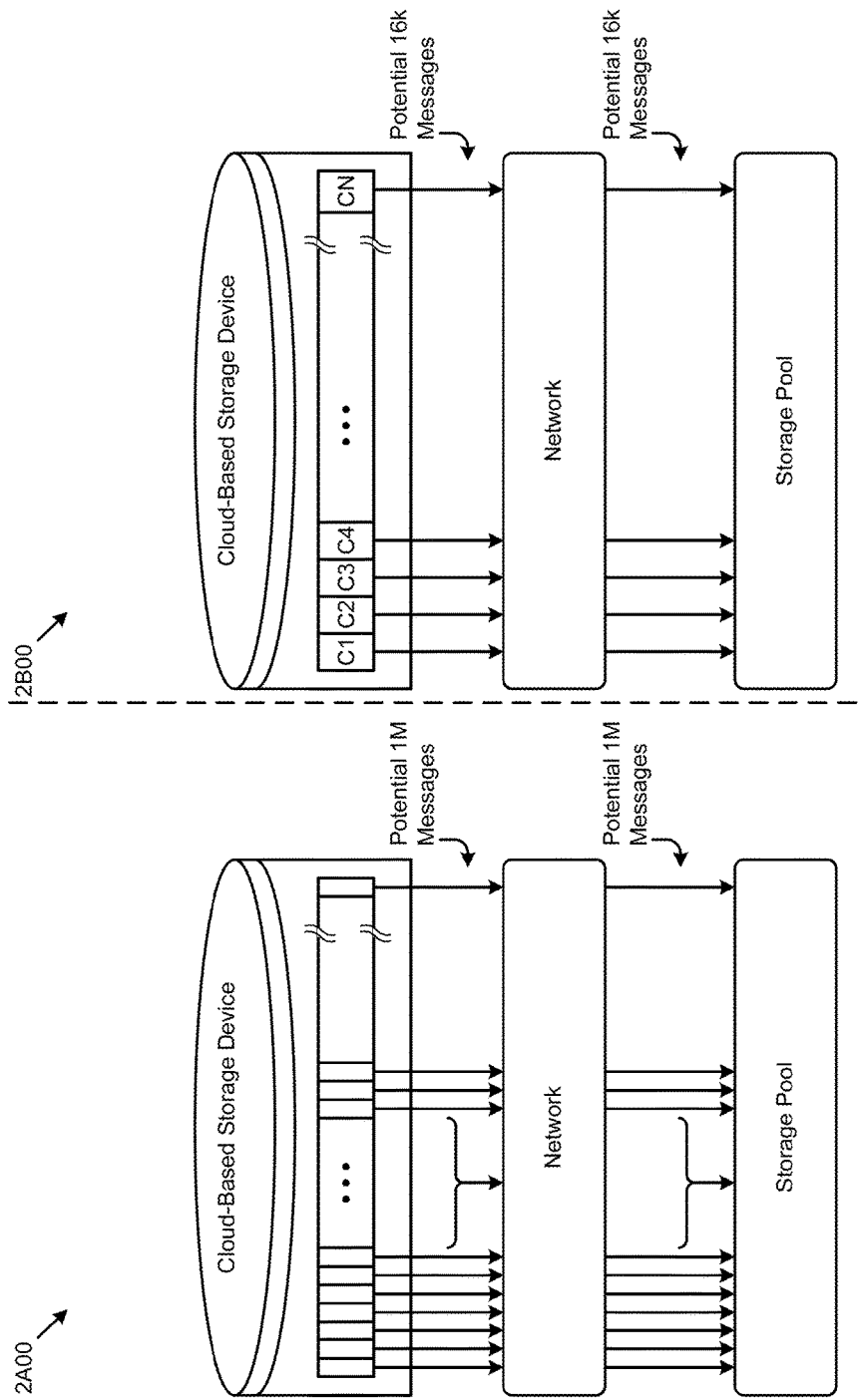

EFFICIENT CHANGE BLOCK TRAINING

FIELD

This disclosure relates to high-performance computing, and more particularly to techniques for efficient change block tracking used in snapshot reconstruction.

BACKGROUND

Many enterprises use hosted or on-premises computing platforms (e.g., towers, racks, backplanes, blades, virtual machines, etc.) to handle enterprise computing needs. The enterprise may also use such hosted or on-premises computing platforms for storage (e.g., direct access storage, networked storage, etc.) to handle persistent storage of various forms of enterprise data. Enterprises tend to provide such computing infrastructure to serve department-level, e-commerce, and management information system needs, and/or mission-critical operations. In some cases, the operations of an enterprise may see widely-varying demand for computing and storage. In such cases, the enterprise may want to use cloud-based services so as to pay only for actual use during such periods of higher demand. For example, a large retailer may have plenty of on-premises computing resources for day-to-day operations, however during certain periods such as a global online rollout of a new product, the traffic at the retailer's website might be many hundreds or even thousands of times greater than is seen under day-to-day conditions. In such a case, the retailer might want to use cloud-based services to handle the transient loads.

Unfortunately, although the computing load can be distributed between the on-premises equipment and cloud-based equipment, the data, and hence the persistent storage, often needs to be available to, and updated by, both the on-premises computing operation as well as the cloud-based computing operations. For example, although the aforementioned retailer can offload website middleware to the cloud so as to handle a large amount of traffic, the retailer would need to make catalog databases and order databases available to the cloud-hosted middleware. This example highlights the situation where data that is normally handled as on-premises data needs to be accessed (e.g., in READ/WRITE scenarios) by computing operations within the cloud. One legacy approach is to move the data or databases (e.g., the order database) in their entirety to the cloud during the period of high demand, and then bring it back (e.g., with updates) to be restored in on-premises storage after the period of high demand has passed. However, such a legacy approach introduces risk and has operational limitations.

Another legacy approach is to keep the database at the on-premises site and access the on-premises data from the cloud over a network, however such a legacy approach has severe performance limitations. Yet another approach is to move a copy of the database or databases to the cloud, execute over the cloud-based copy, and keep track of changes made to the copy (e.g., by capturing block-by-block changes or by taking periodic snapshots). Unfortunately, legacy techniques that are used to keep a change-by-change up-to-date on-premises replication of the cloud-based copy brings about voluminous traffic between the cloud and the on-premises equipment, making such an approach impracticable. Further, legacy techniques fail to provide sufficient resilience; even a momentary power outage or network outage can be disastrous.

The hereunder-disclosed solutions implement change block tracking in mixed environments involving cloud-based computing environments working in conjunction with on-premises equipment and/or hosted equipment environments. The disclosed solutions address long-felt needs. For example, legacy techniques that scan the entire logical address space between snapshots and compute the block level changes are proven to be very inefficient; the technique is resource-intensive and is very slow. What is needed is a technique or techniques to improve over legacy approaches.

BRIEF DESCRIPTION OF THE DRAWINGS

The drawings described below are for illustration purposes only. The drawings are not intended to limit the scope of the present disclosure.

FIG. 2A depicts a network IO overload condition when communicating block changes to a persistent storage facility.

FIG. 2B depicts a parsimonious network IO regime as used when communicating block changes for efficient change block tracking for fast snapshot reconstruction, according to an embodiment.

DETAILED DESCRIPTION

Figure 1A:
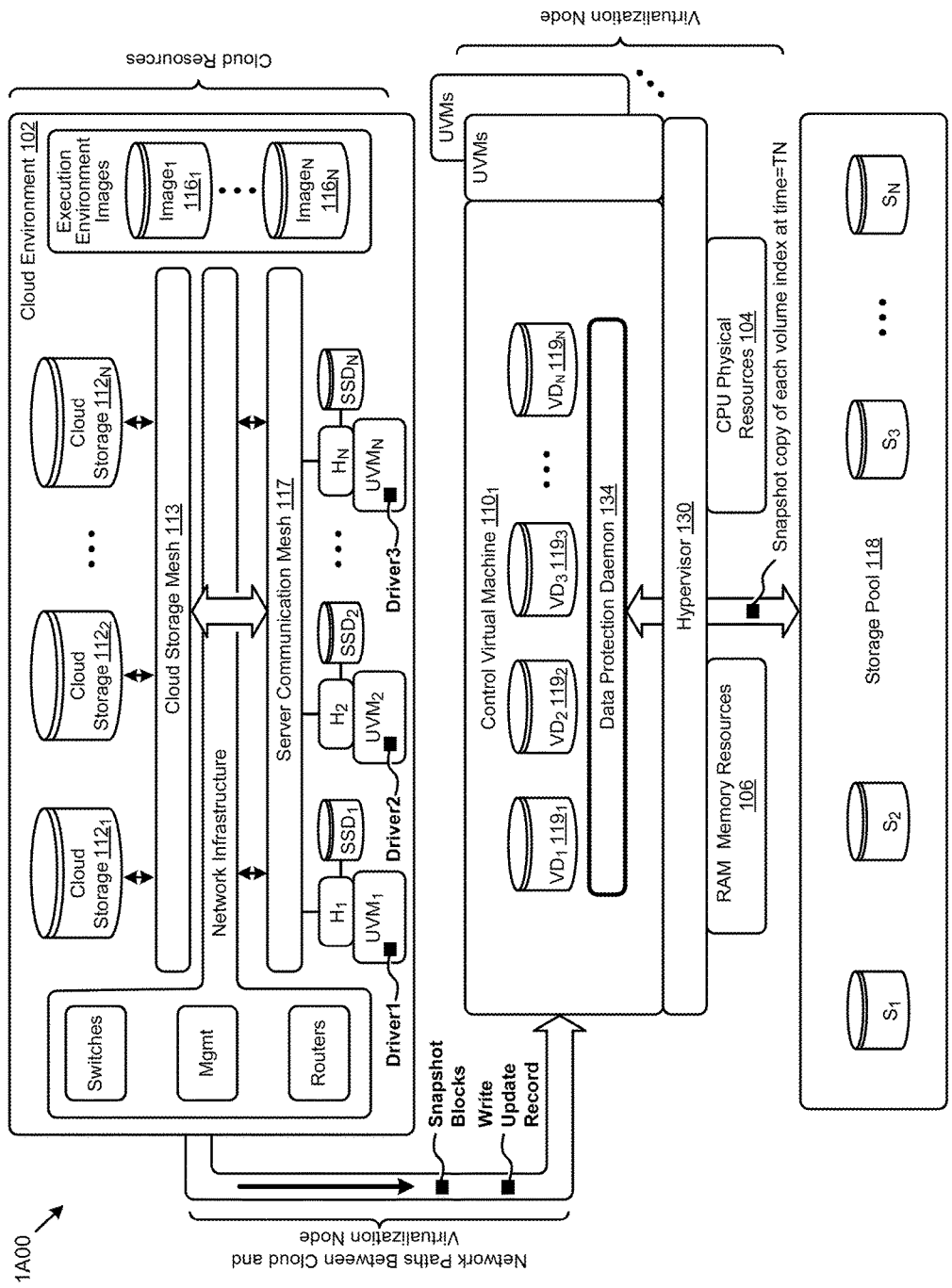
FIG. 1A depicts an environment comprising a virtualization node in communication with cloud resources in a configuration for implementing efficient change block tracking for fast snapshot reconstruction, according to an embodiment.

Some embodiments of the present disclosure address the problem of maintaining a high-availability, block-by-block, up-to-date representation of a storage volume of data that is modified during cloud-based computing. Some embodiments are directed to approaches for combining in-memory block-by-block change-block tracking techniques with a periodically-persisted change block map that can be used for highly-efficient snapshot difference calculations. More particularly, disclosed herein and in the accompanying figures are exemplary environments, systems, methods, and computer program products for efficient block tracking for fast snapshot reconstruction.

Overview

Incremental data preservation for purposes of data protection can be addressed by taking periodic snapshots. Incremental changes between snapshots can be monitored by one or more layers in the storage I/O (input/output or IO) path. Data protection circumstances arise when computing—including write IO to storage devices—is performed in a cloud setting. In many cloud settings one or more guest virtual machine (VMs) run on top of the cloud hypervisor using cloud storage. Unfortunately, cloud-provided data protection solutions (if any) are deficient in their ability to expose any application programming interface to access tracked changed blocks.

Cloud Environments

Cloud environments often provide virtualized environments involving deployment of hypervisors (e.g., one hypervisor per processor) that provide services (e.g., operating system abstractions) to guest virtual machines (guest VMs). The herein-disclosed techniques include implementation of a block-level filter driver that is installed in the guest VMs. A filter driver as used herein is deployed as a kernel component in the IO path. The filter driver is configured to be able to intercept guest-involved IO requests such as IO requests to and from block devices. The extent of such block devices are divided into a plurality of ranges of blocks to cover the full extent of the block device. Changed blocks occurring in any particular range of blocks are tracked in a data structures that maintains a record of occurrences of every write IO to a particular extent range. Portions of the in-memory data structure are persisted periodically. Only the particular portions (e.g., extent range records) of the in-memory data are persisted (e.g., to persistent cloud storage or to the on-premises persistent storage).

More specifically, only the particular portions of the in-memory data that correspond to IO write operations (e.g., extent range records) are persisted (e.g., to the on-premises storage). This technique is parsimonious with respect to the network IO between the cloud environment and the on-premises environment, while still maintaining a high degree of resilience. In many operational scenarios, even a very large data set (e.g., a multi-terabyte virtual disk) will have only a modest number of block extents (e.g., extent range records) that have seen occurrences of write IO operations. In a VM reboot or crash scenario, only certain ranges need be considered when computing changes between snapshots (e.g., only those ranges that had experienced write IO), and furthermore, only those blocks within the range record extents need to be considered when computing changes between snapshots.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. Definitions Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts an environment 1A00 comprising a virtualization node in communication with cloud resources in a configuration for implementing efficient change block tracking for fast snapshot reconstruction. As an option, one or more variations of environment 1A00 or any aspect thereof may be implemented in the context of the architecture and functionality of the embodiments described herein.

The shown cloud environment 102 hosts cloud storage devices (e.g., cloud storage $112_1$, cloud storage $112_2$, cloud storage $112_N$) that are interconnected over a cloud storage mesh 113. The mesh is further interconnected with a server communication mesh 117 (e.g., a rack-to-blade communication backbone). Communication throughout the cloud environment as well as to points outside the cloud environment (e.g., the on-premises equipment) is facilitated through one or more network infrastructure component such as the shown routers, switches and other network management components. Cloud network infrastructure can include multi-protocol routers such IP-to-fiber-channel routers.

As shown, any number of computing elements in the cloud environment can host respective hypervisors (e.g., hypervisor H1, hypervisor H2, hypervisor HN), any of which can operate independently or can operate cooperatively, possibly involving communication over the server communication mesh. A computing element can allocate volatile storage (e.g., RAM) and can also use associated local storage data structures, local scratchpad space, and/or local caching, etc. Each computing element can have associated local storage (e.g., SSD1, SSD2, SSDN), and each computing element can independently perform IO operations to-from the cloud storage devices.

The cloud environment can host execution environment images (e.g., $image_1$ $116_1$ through $image_N$ $116_N$). Such images can comprise applications and other code and data as may be provided by a cloud provider or cloud user. For example, a code base (e.g., an instance) that comprises a program to implement a user application can be transmitted from the on-premises equipment to the cloud-based execution environment images. A management facility can configure and deploy such an application to run as a guest virtual machine (e.g., $UVM_1$, $UVM_2$, $UVM_N$). Such a guest virtual machine can implement any forms of applications, including database applications, network or middleware applications, management applications, etc. In some cases a single instance of an image (e.g., $image_1$ $116_1$) can be deployed any number of times in any number of guest VMs, and any instance of an image can create a private persistent storage volume and/or can create and/or access a shared persistent storage volume. In some cases a large number of guest VMs access the same shared persistent storage volume.

As earlier indicated, hosted or on-premises equipment might be controlled by a particular enterprise, and such an enterprise might use such facilities (e.g., hosted or on-premises equipment) for day-to-day operations. In some cases the hosted or on-premises equipment is sparsely configured (e.g.; comprising only a modest offering of CPU physical resources 104, a modest amount of NVRAM memory resources, a modest amount of RAM memory resources 106, and only a sparse population of local peripheral resources. In other cases, the hosted or on-premises equipment might be fully featured and fully-populated, possibly including any type of hypervisors (e.g., hypervisor 130), as well as fully-featured storage facilities (e.g., S1, S2, S3, SN), any of which can be maintained in a storage pool 118 that is accessible over a network (e.g., a storage area network or an IP packet network) or other communication path. In cases of some on-premises equipment settings, the storage pool is complemented by one or more virtual servers such as the shown control virtual machine $110_1$ that implements access by user virtual machines to physical storage. In some cases a control virtual machine maintains virtual representations (e.g., such as the virtual disks $VD_1$ $119_1$, $VD_2$ $119_2$, $VD_3$ $119_3$, $VD_N$ $119_N$) that are abstractions of data stored in physical storage. In some cases a control virtual machine runs data protection applications, possibly including a data protection daemon 134.

As earlier indicated, during periods of high demand the computing load can be offloaded to run at least partially on cloud-based equipment. For many applications, certain enterprise data (e.g., catalog databases and order databases) might need to be available to the cloud-based computing resources to be used during processing of the computing load. For example, the enterprise might need to make catalog databases and order databases available to the cloud-hosted applications. Moving or sharing enterprise data to a cloud environment raises the need for data protection mechanisms to mitigate or eliminate loss of data, even in the face of computing and/or network equipment outages. One technique involves migrating all or portions of the on-premises data protection facilities to the cloud. In practice, such a technique suffers from many limitations, including high expense and poor performance due to inefficient use of network bandwidth and computing resources. An improved configuration whereby cloud-based guest VMs install a block filter driver (e.g., driver1, driver2, driver3) can be deployed so as to implement efficient change block tracking. The efficient change block tracking can be used for fast and efficient snapshot reconstruction.

Figure 1B:
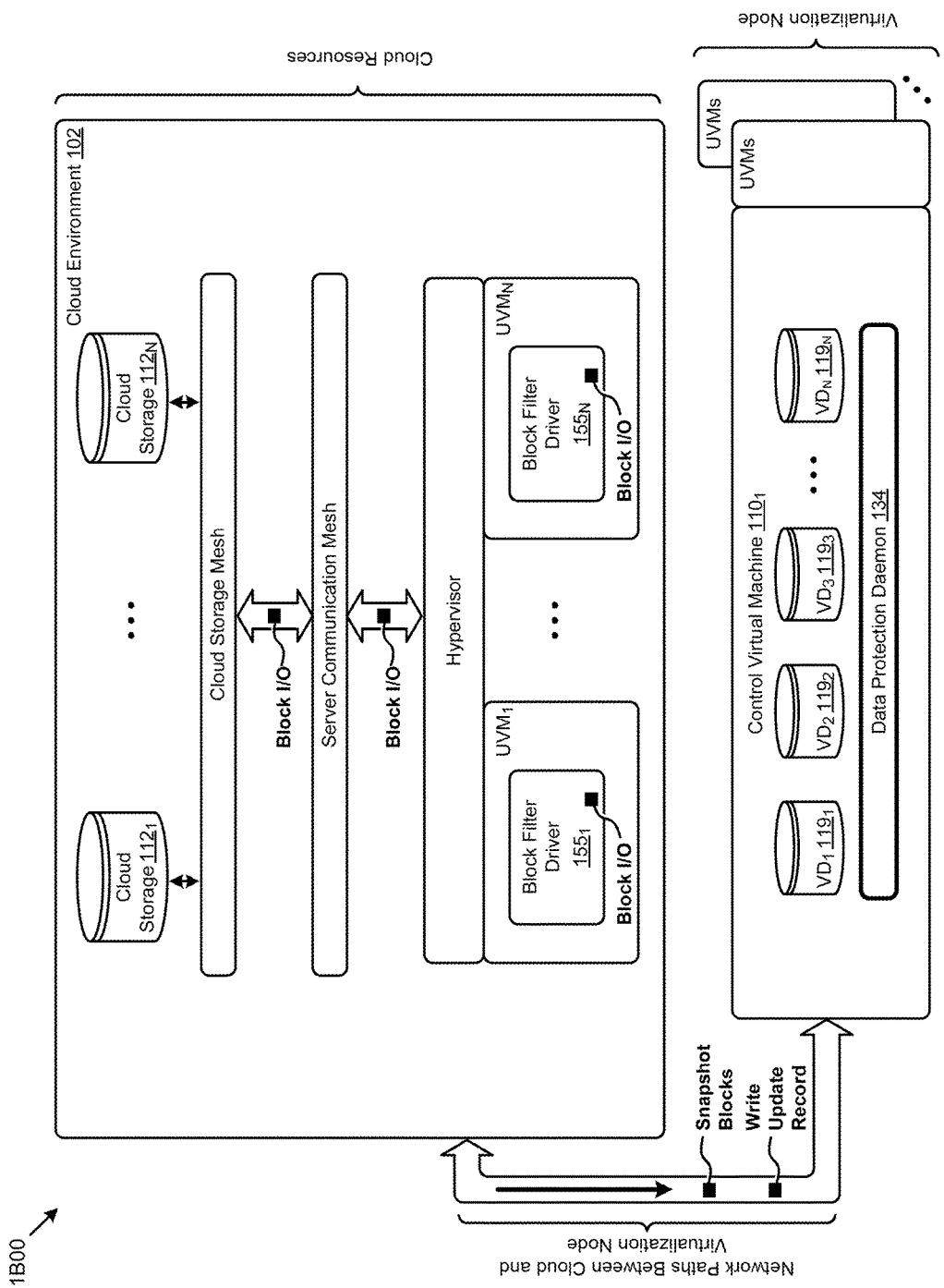
FIG. 1B depicts network communications between cloud-based block filter drivers and a control virtual machine in a configuration for implementing efficient change block tracking for fast snapshot reconstruction, according to an embodiment.

FIG. 1B depicts network communications 1B00 between cloud-based block filter drivers and a control virtual machine in a configuration for implementing efficient change block tracking for fast snapshot reconstruction. As an option, one or more variations of network communications 1B00 or any aspect thereof may be implemented in the context of the architecture and functionality of the embodiments described herein. Also, the network communications 1B00 or any aspect thereof may be implemented in any environment.

The depiction of FIG. 1B includes installation of a driver (e.g., block filter driver $155_1$, block filter driver $155_N$) into each guest VM that participates in WRITE IO to the cloud storage (e.g., cloud storage $112_1$, cloud storage $112_N$). The act of installing the block filter driver places the driver in the IO path between the guest VM and the storage device. When a guest VM configured with such a block filter driver performs a WRITE operation (e.g., a customer places an order), the filter monitors or intercepts the IO and takes specific actions when the IO involves a WRITE or other volume-changing operation. More particularly, a block filter driver can store or otherwise note the occurrence and nature of a block IO operation. In some cases the notation of the occurrence and/or nature of a block IO operation is made to an in-memory data structure (see the block bitmap of FIG. 2C). In other cases, the occurrence and/or nature of a block IO operation is made to a data structure in a persistent storage location (see the write update record of FIG. 2C).

To provide non-invasive change block tracking, a virtual machine or a specially-configured hypervisor maintains a memory-based bitmap of WRITE block IO operations. Such a bitmap, or portions thereof, are flushed periodically to non-volatile storage. Those of ordinary skill in the art will appreciate that ongoing capture of occurrences of WRITE IO into a memory-based bitmap incurs extremely low overhead. This extremely low overhead can be contrasted with network overload conditions as often occur in environments that do not implement the herein-disclosed techniques for efficient change block tracking. Communicating block changes one-by-one to a persistent storage facility risks computing infrastructure overload. An overload example is given in FIG. 2A.

FIG. 2A depicts a network IO overload condition 2A00 when communicating block changes to a persistent storage facility. The example of FIG. 2A depicts a series of blocks in a block-oriented cloud-based storage device. When a WRITE IO operation is performed on a block, the occurrence and nature of a block IO operation is sent over a network (e.g., an IP network) to a storage application (e.g., a data protection daemon). For a storage extent with a storage address space of 1 million blocks, there is a potential for 1 million blocks to be sent over the network to the storage application. This situation can be improved by partitioning the storage address space into multiple ranges. Strictly as one example, the storage address space can be divided into multiple block ranges (e.g., comprising block range extents of a fixed size, such as 64 MB). Continuing this example, rather than loading the network with a flood of IO, such a technique can reduce the network IO to just a fraction of that. One possible partitioning is shown and discussed as pertains to FIG. 2B.

FIG. 2B depicts a parsimonious network IO regime 2B00 as used when communicating block changes for efficient change block tracking for fast snapshot reconstruction. As an option, one or more variations of parsimonious network IO regime 2B00 or any aspect thereof may be implemented in the context of the architecture and functionality of the embodiments described herein. Also, the parsimonious network IO regime 2B00 or any aspect thereof may be implemented in any environment.

Figure 2C:
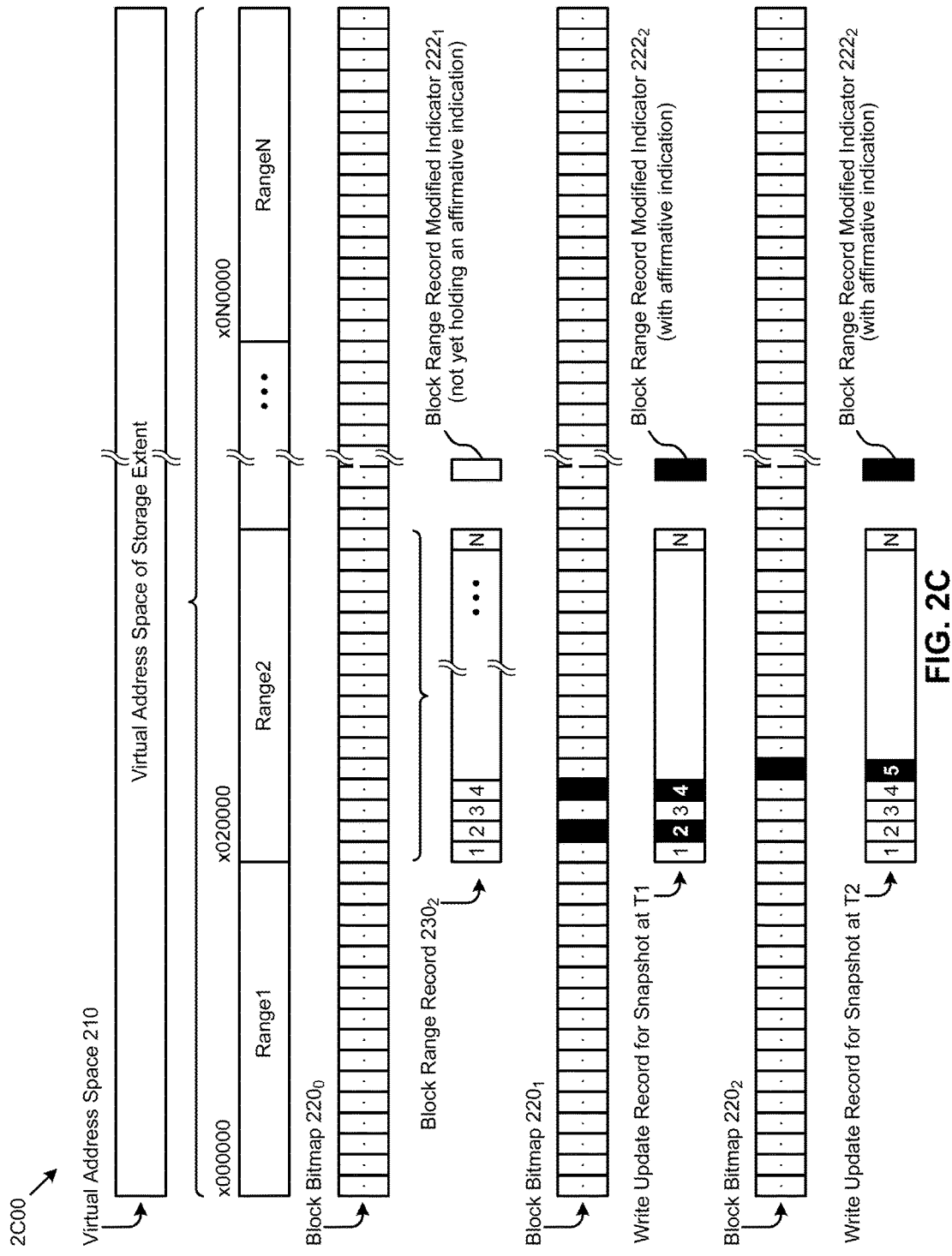
FIG. 2C presents an organization of data structures that are used to implement efficient change block tracking for fast snapshot reconstruction, according to an embodiment.

The embodiment shown in FIG. 2B is merely one example. The aforementioned storage extent with a storage address space of 1 million 1 MB blocks can be divided into chunks (e.g., C1, C2, C3, CN). Strictly as an example, a chunk can represent 64 MB. In the case of a storage device having an extent (e.g., a file) comprising 1 million blocks, rather than a nominal 1 million messages being sent (e.g., to capture the occurrences at the individual 1 MB block level), if the 1 million block extent were divided into chunks representing a storage address space of 6 MB, then a nominal 16 thousand messages would be sent (e.g., to capture the occurrences at the individual 64 MB chunk level). This is a significant improvement. Data structures to capture both the aspect of dividing the storage address space as well as data structures to capture block-level IO activity are shown and discussed in FIG. 2C.

FIG. 2C presents an organization of data structures 2C00 that are used to implement efficient change block tracking for fast snapshot reconstruction. As an option, one or more variations of data structures 2C00 or any aspect thereof may be implemented in the context of the architecture and functionality of the embodiments described herein. Also, the data structures 2C00 or any aspect thereof may be implemented in any environment.

The size of a storage extent is represented as a virtual address space 210. This range can be divided into a plurality of ranges. As shown, the virtual address space 210 is divided into a plurality of ranges having lengths that represent 64 MB (e.g., 64 blocks of 1 MB each). The ranges can be named, numbered or otherwise indexed. In this example, the ranges are named "Range1", "Range2", and so on, each range being associated with an address. In this example, the ranges are associated with addresses "x000000", "x020000", and so on.

Block Bitmap

A block bitmap $220_0$ is initialized at some point in time, and maintained (e.g., in memory) during IO to the storage extent. Inasmuch as the virtual address space range represents the entirety of the virtual address space of the storage extent, the block bitmap also represents the entirety of the virtual address space of the storage extent at a block-by-block level of granularity. The block bitmap can be implemented as a field of bits, or a field of bytes, or as a field of words. For a block bitmap that is implemented as a field of bits, i.e., a storage extent of 1 million (2E20) blocks, a block bitmap bits requires 1 million (2E20) bits, which can be bytewise addressed from an array of 131,072 (2E17) bytes.

Aspects of the bitmap (e.g., that only one bit per block is needed to represent if the block has been written to or not) can be combined with aspects of the ranges. Specifically, the block bitmap can be divided into ranges for as many ranges as are defined, and each range division can be represented using a block range record. As shown, block range record $230_2$ captures the block bitmap values for its respective range. A block range record is organized so as to indicate if a block within the range has been modified. The indication as to whether or not a block within the range has been modified can be captured in a data structure using any known technique. Furthermore, a block range record can be transmitted over a network (e.g., as payload in an IP packet).

Figure 3:
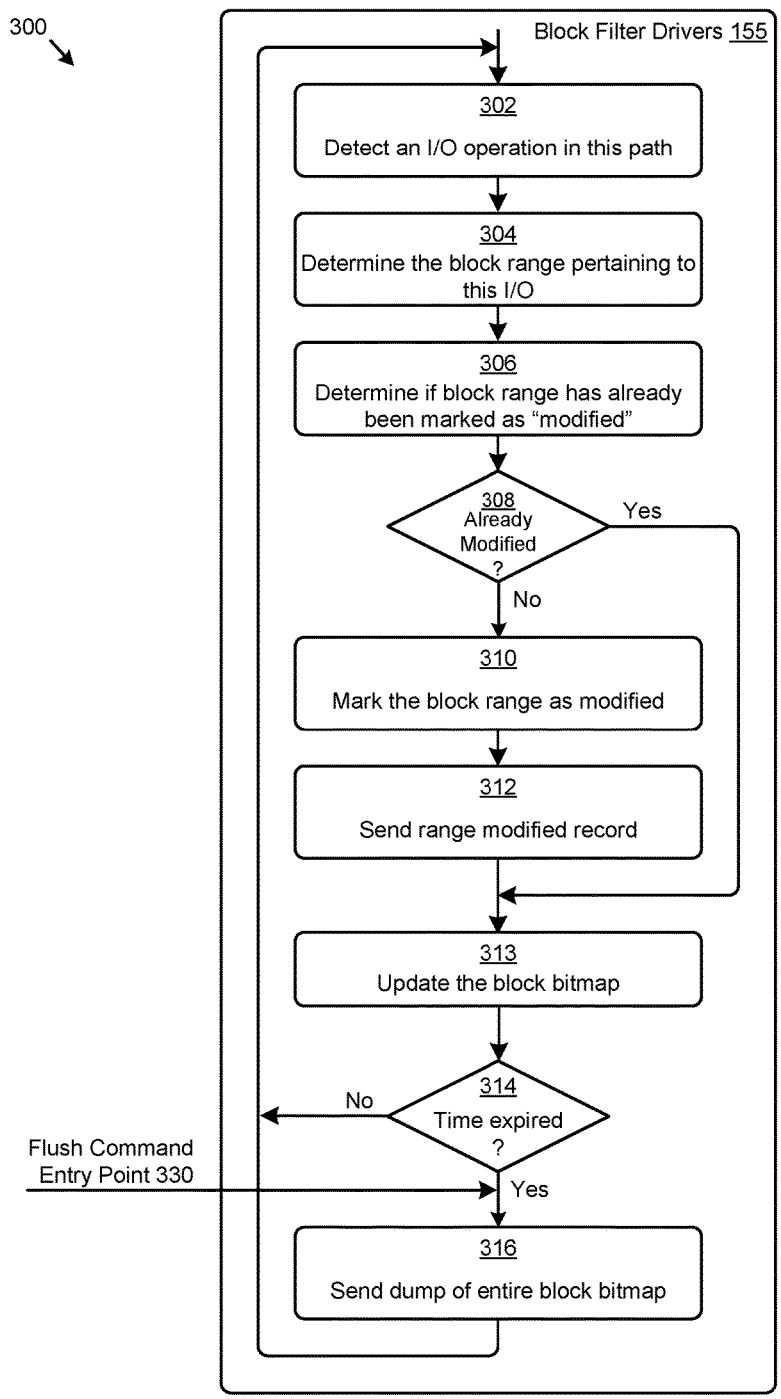
FIG. 3 exemplifies a block filter driver processing flow as used to implement efficient change block tracking for fast snapshot reconstruction, according to an embodiment.

As is discussed further as pertaining to FIG. 3, some embodiments suppress resending of block range records during certain timeframes. To accommodate such embodiments, an indicator (e.g., the shown block range record modified indicator $222_1$) is associated on a one-to-one correspondence with each block range record (e.g., the shown block range record modified indicator $222_2$). Such an indicator serves to indicate that at least one block within the associated range has been modified. Such an indicator can serve to suppress network traffic associated with the sending/re-sending) of block range records. For example, in exemplary embodiments, a particular block range record is sent only once during a snapshot period (e.g., only when the first write in this region is encountered). Ongoing writes during the snapshot period are recorded in memory (e.g., in the block bitmap). Additional transmissions of a block range record can be suppressed until a flush operation or until the end of a snapshot interval.

Write Update Records

The entire block bitmap, or portions of the block bitmap, can be persisted (e.g., flushed) periodically. A successful flush indicates that earlier block range records are now out of date and can be discarded. The shown example exemplifies the circumstance that during the period, the only blocks that were written to were the second and fourth blocks of range 2. Strictly as alternative embodiments, the entire block bitmap (e.g., block bitmap $220_2$) or portions of the block bitmap (e.g., write update record for snapshot at T1) can be persisted. The entire block bitmap or portions of the block bitmap can be cleared after a successful flush operation. At a later time, there may be additional IO to the ranges, and the occurrence of such IOs to a particular block in a range can be captured (e.g., see block 5 indication of the write update record for snapshot at T2).

Operations pertaining to modifying the foregoing data structures can be performed by a block filter driver, which is presently discussed.

FIG. 3 exemplifies a block filter driver processing flow 300 as used to implement efficient change block tracking for fast snapshot reconstruction. As an option, one or more variations of block filter driver processing flow 300 or any aspect thereof may be implemented in the context of the architecture and functionality of the embodiments described herein. Also, the block filter driver processing flow 300 or any aspect thereof may be implemented in any environment.

One or more block filter drivers 155 are installed into a guest VM, and are situated in the storage IO path pertaining to their respective one or more storage extents. The block filter driver is able to detect a subject IO pertaining to its respective storage extent (see step 302) and can then determine the block range into which a subject IO pertains (see step 304). The driver determines (see step 306) if the block range record has been earlier modified in this period (e.g., based on the block range record modified indicator for the associated block range record). If the block range record had not been earlier modified in this period (see decision 308), then the "No" branch is taken, and (1) the block range is marked as modified (see step 310), and (2) a range modified record is sent (see step 312). The contents of the range modified record can include an indication of the block level modifications (e.g., block 2 was modified), or the contents of the range modified record can be truncated. If the block range record had been earlier modified in this period (see decision 308), then processing takes the "Yes" branch and the block bitmap is updated (see step 313). The driver checks (see decision 314) to determine if a particular timeframe (e.g., a flush period, a snapshot period) has expired, and if so the entire bitmap is dumped (e.g., sent over the network).

Variations of block filter drivers 155 can have additional entry points. In some cases a flush command entry point 330 can be entered (e.g., asynchronously) so as to cause a flush of the block bitmap. For example, during a snapshot operation, a quiesce request might be issued to the guest VM, and such a quiesce request can trigger a flush of the then current block bitmap 316 (as shown) or can trigger a flush of the then current write update records. The block filter driver processing flow 300 can be applied in various data protection scenarios, some examples of which are shown and described as pertaining to FIG. 4.

Figure 4:
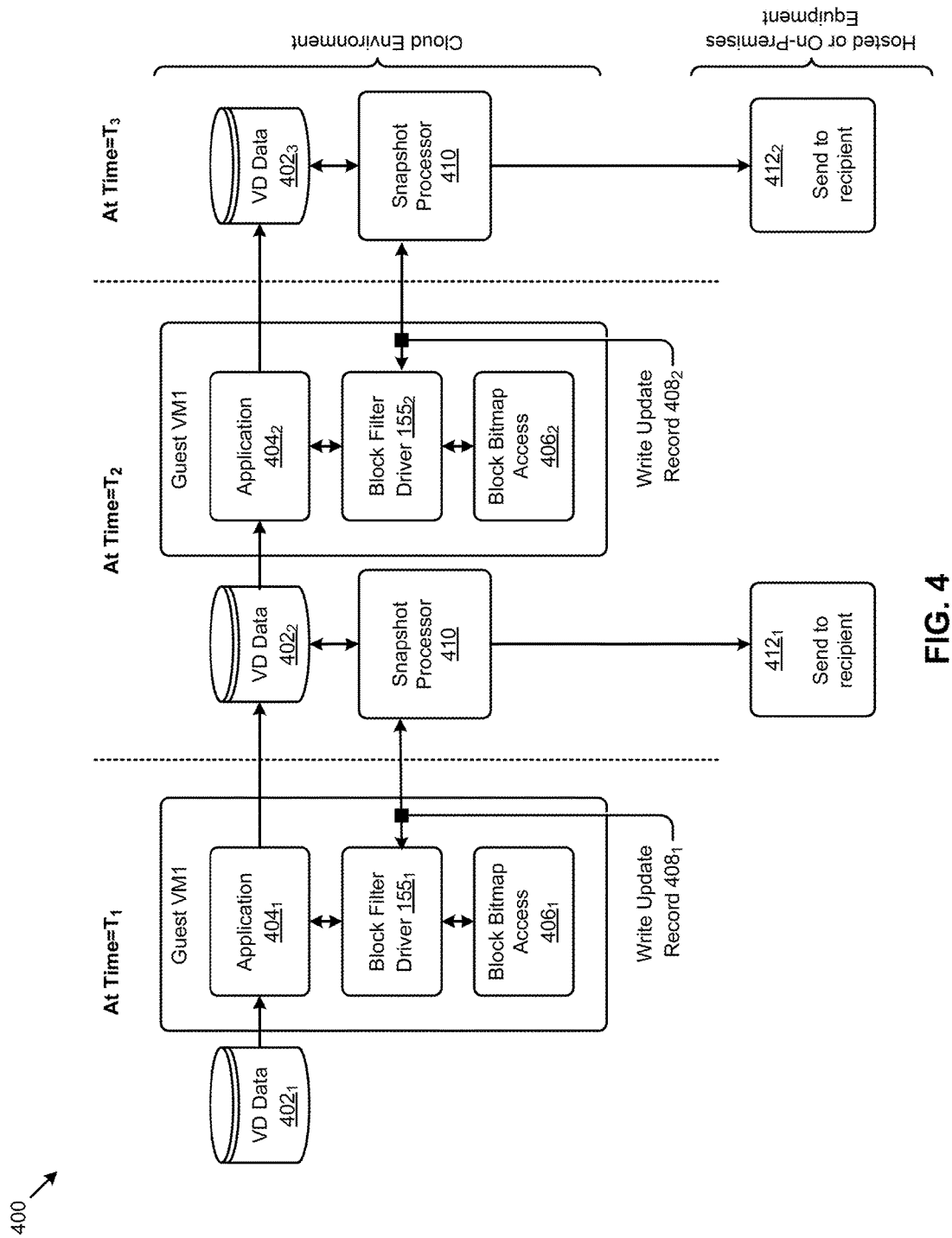
FIG. 4 presents a time series progression showing operations performed by a guest virtual machine to implement efficient change block tracking for fast snapshot reconstruction, according to an embodiment.

FIG. 4 presents a time series progression 400 showing operations performed by a guest virtual machine to implement efficient change block tracking for fast snapshot reconstruction. As an option, one or more variations of time series progression 400 or any aspect thereof may be implemented in the context of the architecture and functionality of the embodiments described herein. Also, the time series progression 400 or any aspect thereof may be implemented in any environment.

As shown, a guest VM (e.g., VM1) operates over virtual disk data (e.g., VD Data $402_1$). An application $404_1$ as well as a block filter driver $155_1$ runs within the guest VM1. Block bitmap access $406_1$ is provided to the guest VM1. The actual block bitmap can be stored in the guest VM virtual memory space, or block bitmap access $406_1$ can be availed through calls to a hypervisor or kernel.

As transactions occur, the block filter driver $155_1$ updates the block bitmap (see FIG. 3). A snapshot processor 410 can interact with the block filter driver $155_1$ and/or the application so as to request quiescence or other conditioning in preparation for taking a snapshot. As an example, the snapshot processor 410 can request quiescence of the application $404_1$. Upon receiving an indication of a quiescent state, the snapshot processor can request action to be taken on the then current data structures. In this example, the block filter driver $155_1$ responds to a snapshot processor request to quiesce by delivering one or more write update records $408_1$. The snapshot processor in turn takes action to send (e.g., over a network) the one or more write update records $408_1$ to a recipient such as a data protection daemon in a control virtual machine running on hosted or on-premises equipment (e.g., see operation $412_1$). A snapshot at time=$T_2$ (e.g., a snapshot of the state of VD data $402_2$) is taken, after which action the guest VM is released from quiescence and continues to operate its unquiesced application $404_2$, which operations in turn may make block changes to VD Data $402_3$, possibly resulting in changes to the block bitmap data via a block bitmap access $406_2$. Further snapshot events and/or flush events can occur, at which times the snapshot processor 410 takes action to send the one or more write update records $408_2$ to a recipient (e.g., see operation $412_2$). As previously indicated, a particular block range record is sent only once during a snapshot period (e.g., contemporaneously with when the first write in a respective region is encountered).

Figure 5A:
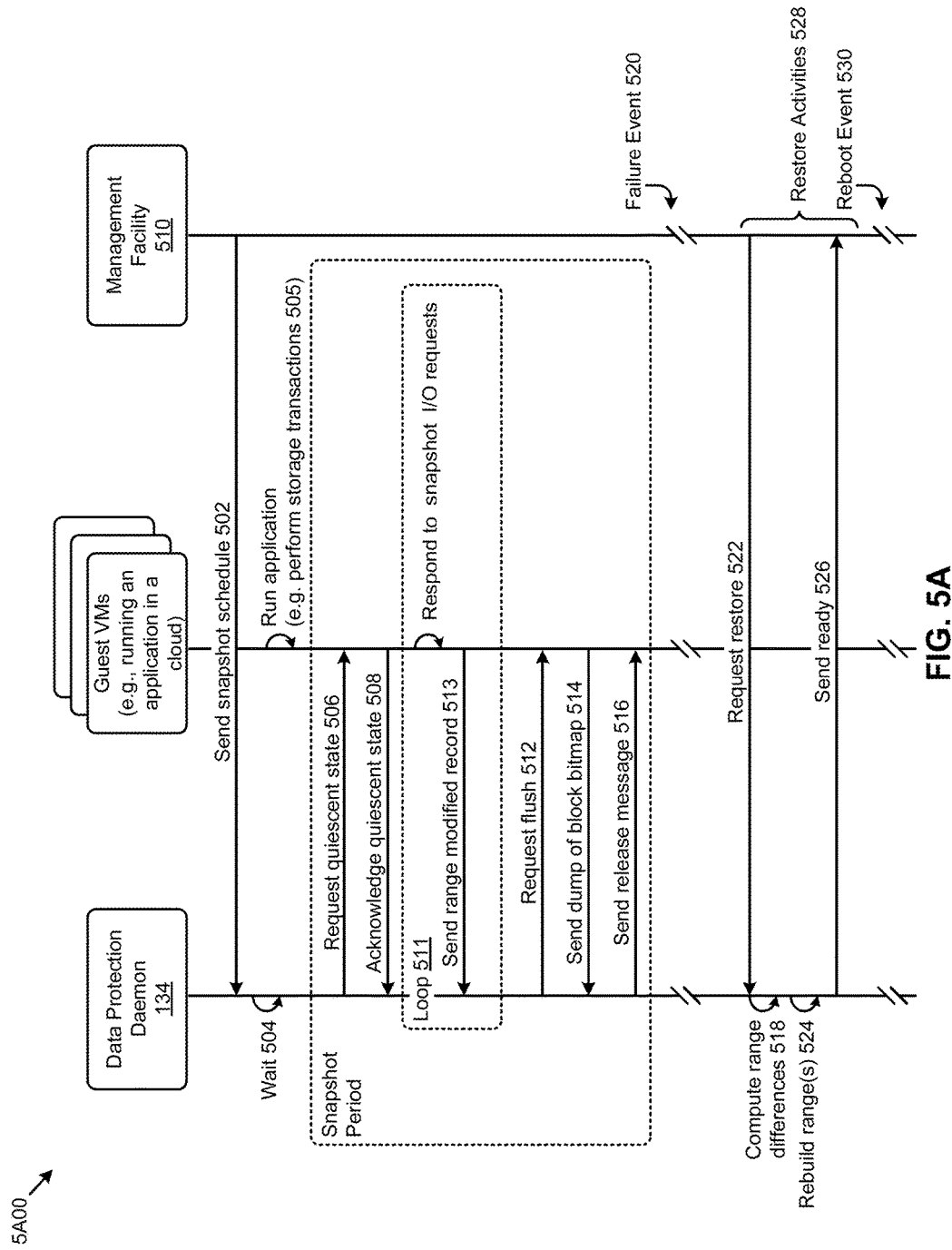
FIG. 5A presents a protocol showing messages and operations performed to implement efficient change block tracking for fast snapshot reconstruction, according to an embodiment.

FIG. 5A presents a protocol 5A00 showing messages and operations performed to implement efficient change block tracking for fast snapshot reconstruction. As an option, one or more variations of protocol 5A00 or any aspect thereof may be implemented in the context of the architecture and functionality of the embodiments described herein. Also, the protocol 5A00 or any aspect thereof may be implemented in any environment.

The embodiment shown in FIG. 5A is merely one example of a scenario where snapshots are taken periodically, and using the techniques as disclosed herein, fast snapshot reconstruction can be accomplished (e.g., see restore activities 528) after a failure event of some sort (e.g., see failure event 520). Using the techniques as disclosed herein, the blocks of a storage extent that had experienced changes between ongoing snapshot events can be quickly identified, and thus the changes to a to-be-restored snapshot can be quickly generated and the failed system can be quickly brought back to a restored state (e.g., see reboot event 530).

The shown protocol includes a management facility 510 that can receive commands from a user (e.g., an administrator) to establish a snapshot schedule or periodicity. Such a schedule can be sent to a data protection daemon 134, which in turn can take snapshots on the given schedule (see message 502). The daemon will pend or otherwise wait for the time to take a snapshot (see operation 504). During such a pending or waiting time period, guest VMs continue to operate and perform storage operations over a storage extent (see operation 505). When it is time for a snapshot to be taken, the daemon will request quiescence (see message 506) from the guest VMs, which will in turn acknowledge their respective quiescent states (see message 508). The data protection daemon then operates in a loop (see loop 511) that serves to build a snapshot based on the change block as indicated in the range modified records as captured by the filter driver in the guest VMs (see message 513). The protocol might raise a flush event (see message 512) to which the recipient VM will respond with a dump of the block bitmap (see message 514). When the snapshot operations are deemed to be completed, the daemon can send a release message (see message 516) to the quiesced VMs such that the guest VM can resume operations.

At some point there may occur a failure event 520. The management facility can make a request to the daemon (see message 522), and also the management facility can invoke restore activities 528, possibly using services of the data protection daemon 134. Such services might include fast build of a restore snapshot based on a previous snapshot in combination with a set of restored blocks as may have been modified since the previous snapshot was taken (see operation 518). When the restore activities have taken place and the storage extent ranges having changes have been rebuilt (see operation 524), the management facility receives a readiness indication (see message 526), and a user or administrator can initiate a reboot event 530.

Figure 5B:
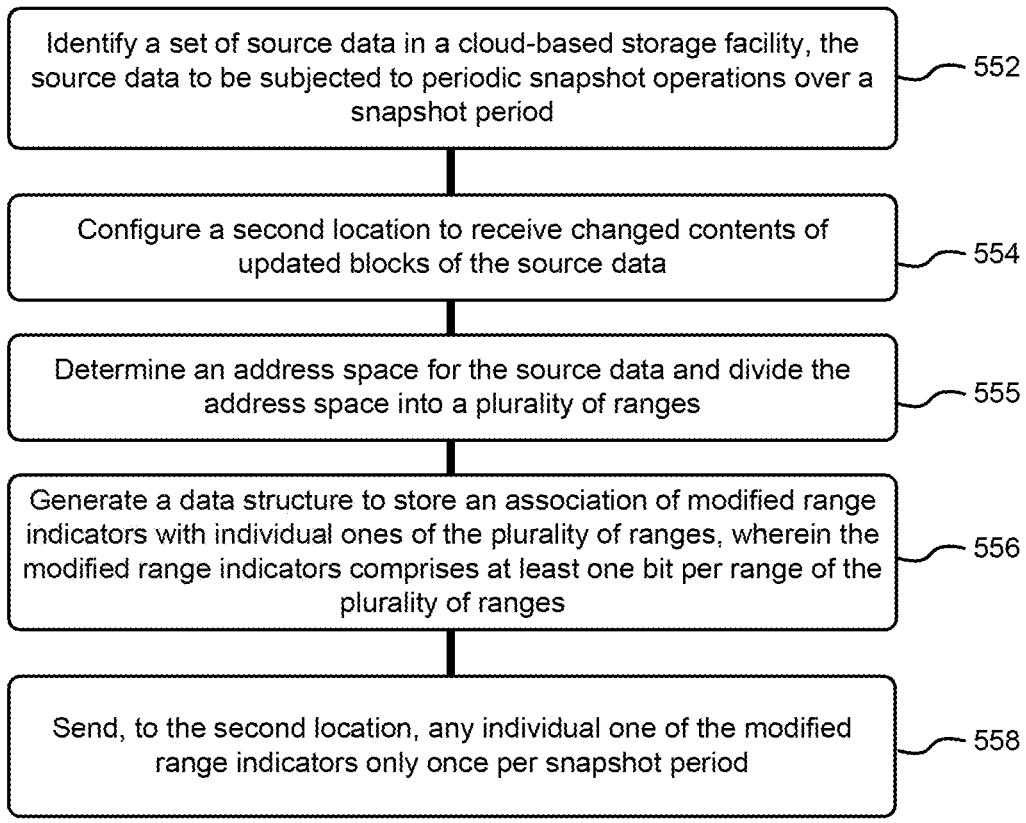
FIG. 5B and FIG. 5C present flowcharts showing operations performed to implement efficient change block tracking for fast snapshot reconstruction, according to some embodiments.
Figure 5C:
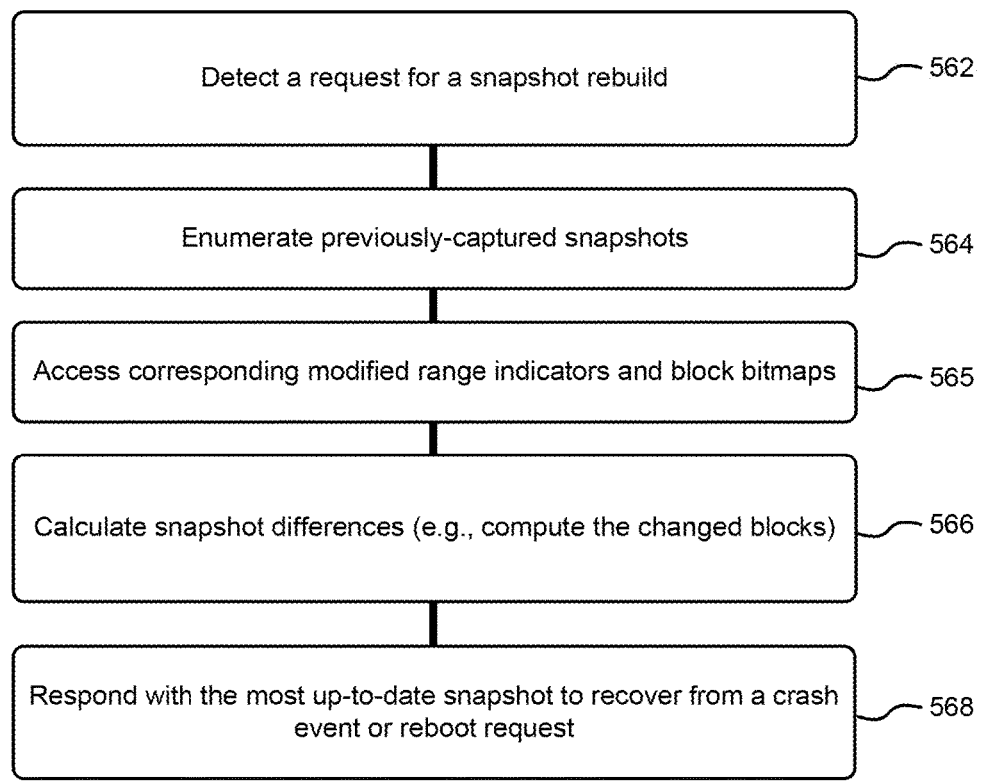

FIG. 5B and FIG. 5C present flowcharts showing operations performed to implement efficient change block tracking for fast snapshot reconstruction.

FIG. 5B depicts steps taken on cloud-based equipment such as when cloud-based services are used to handle the transient loads. At step 552, a set of source data in a cloud-based storage facility (e.g., customer order records) are subjected to periodic snapshot operations so as to provide data protection (see step 554). Changes to the subject data (e.g., changed blocks) are detected and the occurrence of a change is recorded in a block range record as well as in a block bitmap. Once per snapshot period, a pre-configured second location (e.g., in a location geographically separate from the cloud-based storage facility) receives changed contents of updated blocks of the source data. In this embodiment, the changed contents of updated blocks as well as a write update record need only be sent once per snapshot period, thus reducing I/O demand over the network between the first location and the second location. At step 555, the address space for the source data is divided into a plurality of ranges. At step 556 a data structure is generated to store an association of modified range indicators with individual ones of the plurality of ranges, wherein the modified range indicators comprises at least one bit per range of the plurality of ranges. Bandwidth demand is further reduced due to parsimonious sending of individual modified range indicators only once per snapshot period (see step 558).

FIG. 5C depicts steps taken for fast snapshot reconstruction. At step 562, a request for a snapshot rebuild is detected. The platform (e.g., at the aforementioned second location) enumerates previously-captured snapshots (see step 564). For any of the previously-captured snapshots, corresponding modified range indicators and block bitmaps are accessed (see step 565) and used to calculate snapshot differences (see step 566). Upon computing the changed block between two snapshots, the platform has the needed data to respond with a most up-to-date, consistent snapshot so as to recover from a crash event or reboot request (see step 568).

Additional Embodiments of the Disclosure

Additional Practical Application Examples

Figure 6A:
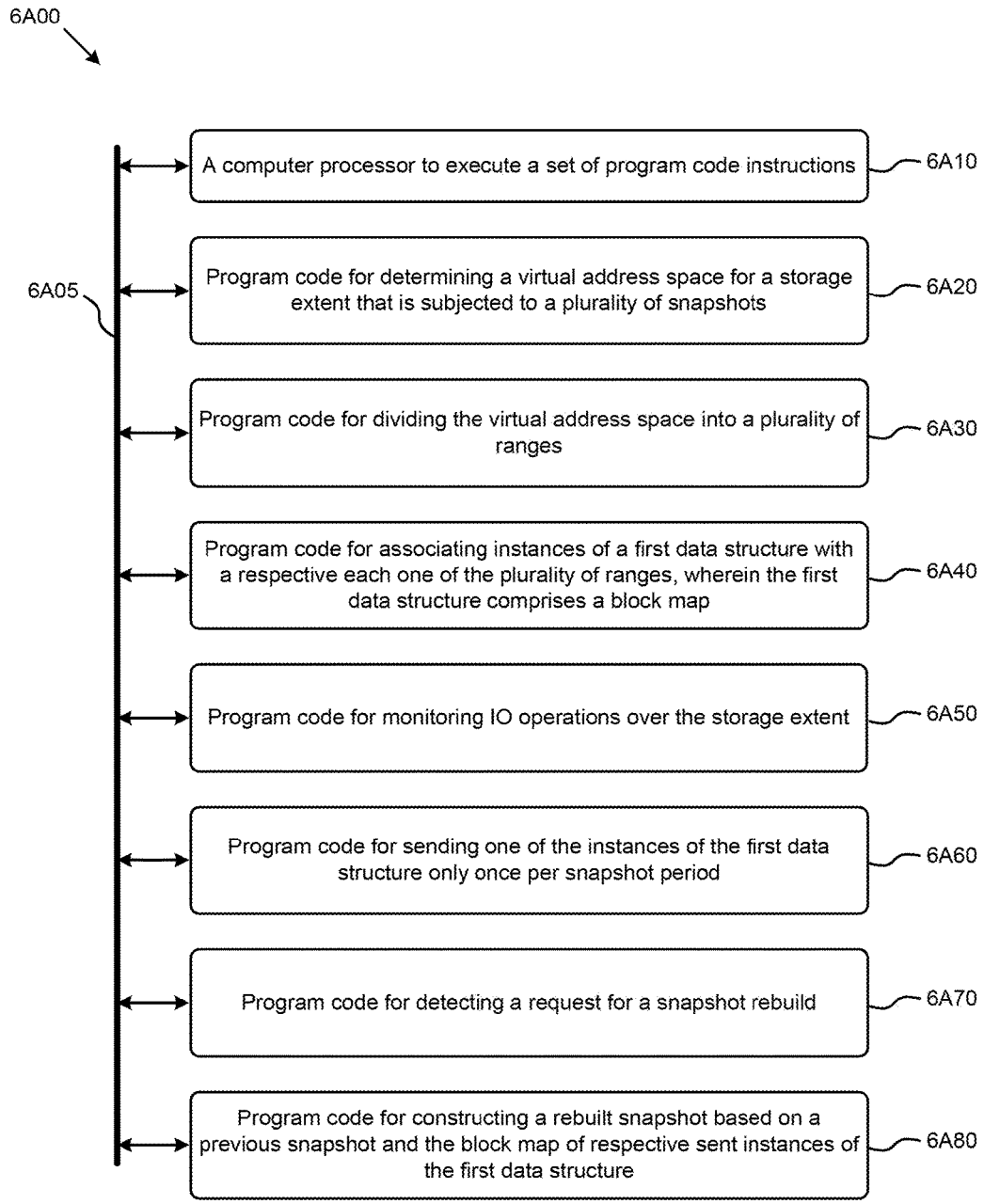
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible. FIG. 6A depicts a block diagram of a system to perform certain functions of a computer system. As an option, the present system 6A00 may be implemented in the context of the architecture and functionality of the embodiments described herein. Of course, however, the system 6A00 or any operation therein may be carried out in any desired environment. The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims. The shown embodiment implements a portion of a computer system, presented as system 6A00, comprising a computer processor to execute a set of program code instructions (see module 6A10) and modules for accessing memory to hold program code instructions to perform: determining a virtual address space for a storage extent that is subjected to a plurality of snapshots (see module 6A20); dividing the virtual address space into a plurality of ranges (see module 6A30); associating instances of a first data structure with a respective each one of the plurality of ranges, wherein the first data structure comprises a block map (see module 6A40); monitoring IO operations over the storage extent (see module 6A50); sending one of the instances of the first data structure only once per snapshot period (see module 6A60); detecting a request for a snapshot rebuild (see module 6A70); and constructing a rebuilt snapshot based on a previous snapshot and the block map of respective sent instances of the first data structure (see module 6A80).

Figure 6B:
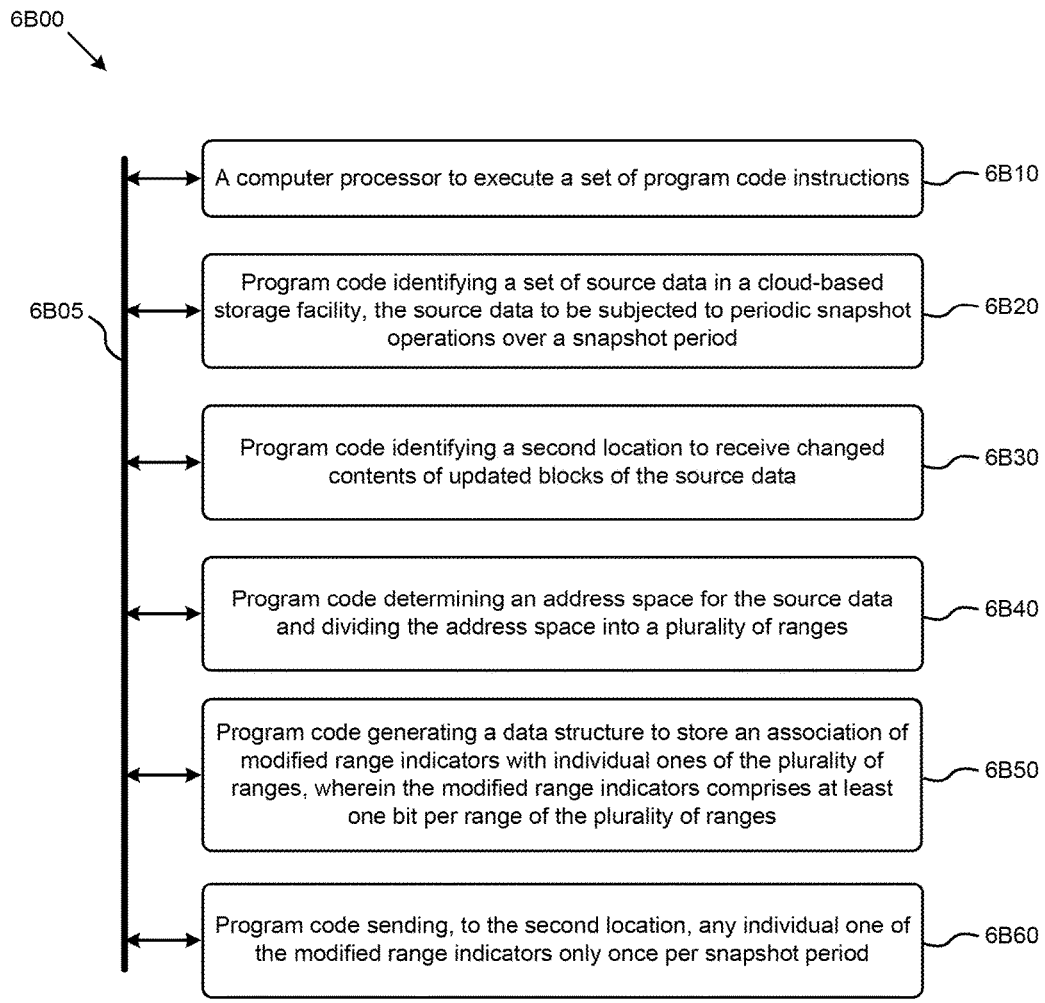

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment. The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims. The shown embodiment implements a portion of a computer system, presented as system 6B00, comprising a computer processor to execute a set of program code instructions (see module 6B10) and modules for accessing memory to hold program code instructions to perform: identifying a set of source data in a cloud-based storage facility, the source data to be subjected to periodic snapshot operations over a snapshot period (see module 6B20); identifying a second location to receive changed contents of updated blocks of the source data (see module 6B30); determining an address space for the source data and dividing the address space into a plurality of ranges (see module 6B40); generating a data structure to store an association of modified range indicators with individual ones of the plurality of ranges, wherein the modified range indicators comprises at least one bit per range of the plurality of ranges (see module 6B50); and sending, to the second location, any individual one of the modified range indicators only once per snapshot period (see module 6B60).

System Architecture Overview

Additional System Architecture Examples

Figure 7A:
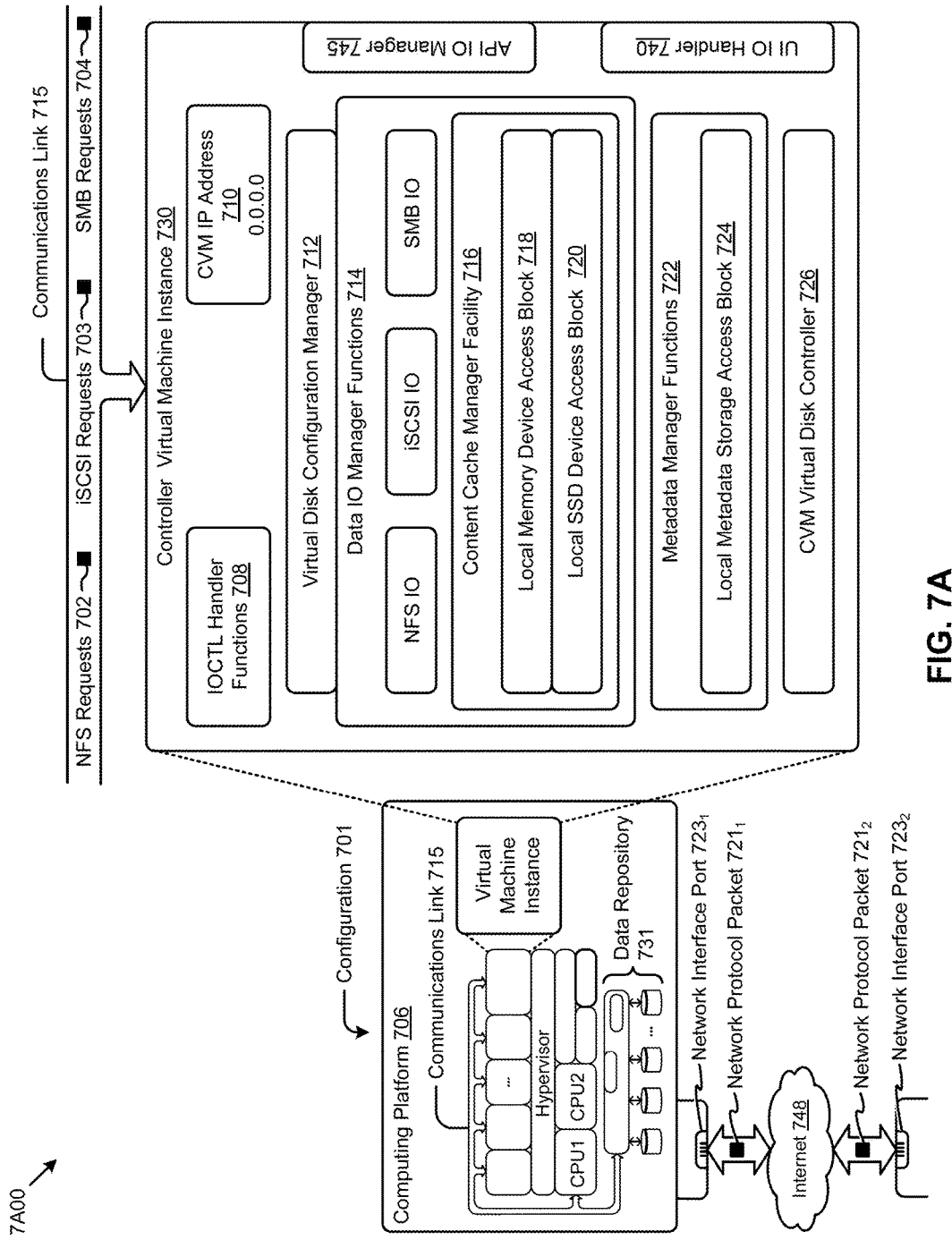
FIG. 7A and FIG. 7B depict architectures comprising collections of interconnected components suitable for implementing embodiments of the present disclosure and/or for use in the herein-described environments.

FIG. 7A depicts a virtual machine architecture 7A00 comprising a collection of interconnected components suitable for implementing embodiments of the present disclosure and/or for use in the herein-described environments. The shown virtual machine architecture 7A00 includes a virtual machine instance in a configuration 701 that is further described as pertaining to the controller virtual machine instance 730. A controller virtual machine instance receives block IO storage requests as of network file system (NFS) requests in the form of NFS requests 702, and/or internet small computer storage interface (iSCSI) block IO requests in the form of iSCSI requests 703, and/or Samba file system requests (SMB) in the form of SMB requests 704. The controller virtual machine instance publishes and responds to an internet protocol (IP) address (e.g., see CVM IP address 710. Various forms of input and output (IO) can be handled by one or more IO control handler IOCTL handler functions 708 that interface to other functions such as data IO manager functions 714, metadata manager functions 722. As shown, the data IO manager functions can include communication with a virtual disk configuration manager 712, and/or can include direct or indirect communication with any of various block IO functions (e.g., NFS IO, iSCSI IO, SMB IO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packetization (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes, for example, solid state storage devices (SSD), or optical or magnetic disks such as disk drives or tape drives. Volatile media includes dynamic memory such as a random access memory. As shown, the controller virtual machine instance 730 includes a content cache manager facility 716 that accesses storage locations, possibly including local DRAM (e.g., through the local memory device access block 718) and/or possibly including accesses to local solid state storage (e.g., through local SSD device access block 720).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local meta-data storage access block 724. The external data repository 731, can be configured using a CVM virtual disk controller 726, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 701 can be coupled by a communications link 715 (e.g., backplane, LAN, PTSN, wired or wireless network, etc.) and each instance may perform respective portions of sequences of instructions as may be required to practice embodiments of the disclosure The shown computing platform 706 is interconnected to the Internet 748 through one or more network interface ports (e.g., network interface port $723_1$ and network interface port $723_2$). The configuration 701 can be addressed through one or more network interface ports using an IP address. Any operational element within computing platform 706 can perform sending and receiving operations using any of a range of network protocols, possibly including network protocols that send and receive packets (e.g., see network protocol packet $721_1$ and $721_2$).

The computing platform 706 may transmit and receive messages that can be composed of configuration data, and/or any other forms of data and/or instructions organized into a data structure (e.g., communications packets). In some cases, the data structure includes program code instructions (e.g., application code), communicated through Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of efficient change block tracking for fast snapshot reconstruction.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of efficient change block tracking for fast snapshot reconstruction). Such files or records can be brought into and/or stored in volatile or non-volatile memory.

Figure 7B:
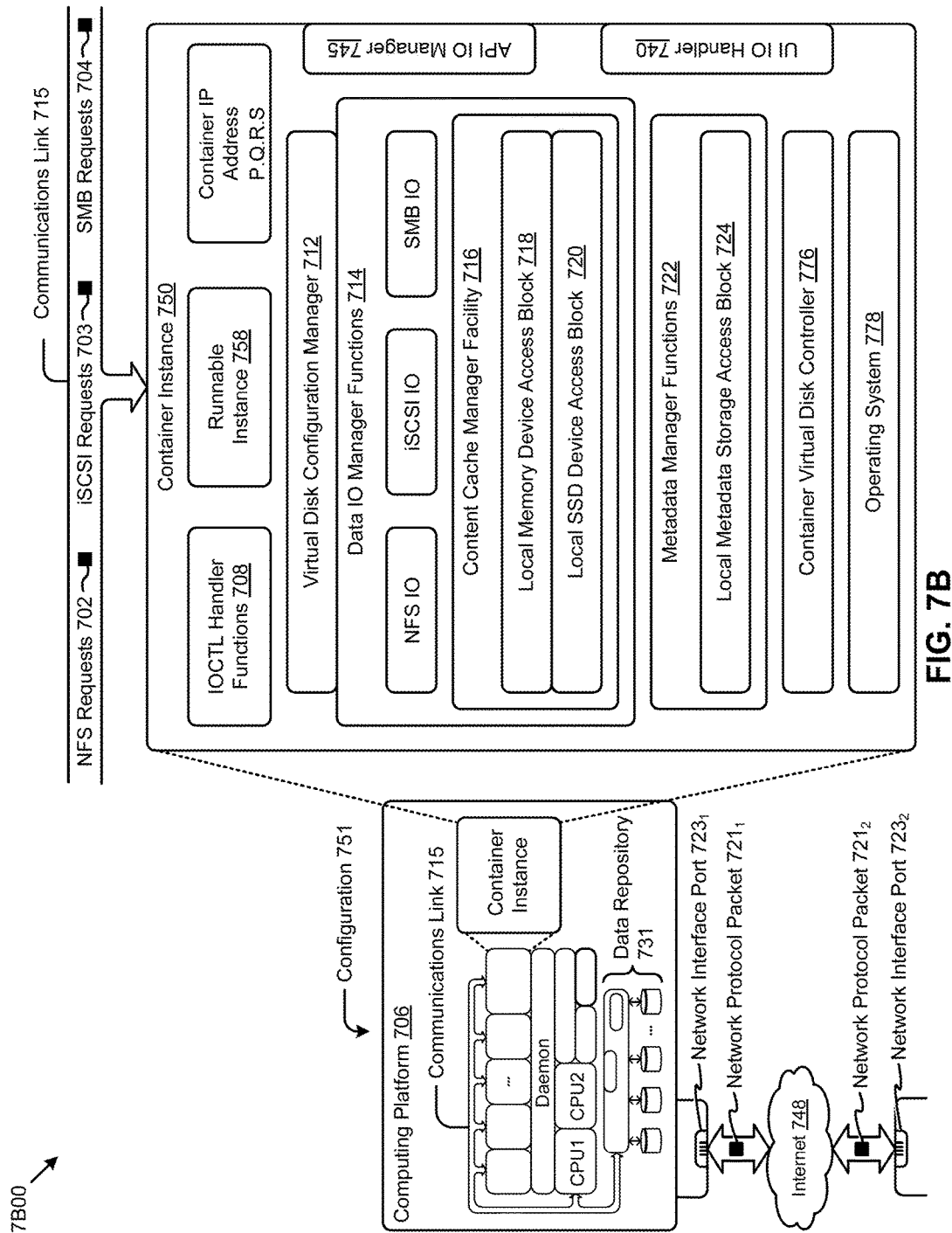

FIG. 7B depicts a containerized architecture 7B00 comprising a collection of interconnected components suitable for implementing embodiments of the present disclosure and/or for use in the herein-described environments. The shown containerized architecture 7B00 includes a container instance in a configuration 751 that is further described as pertaining to the container instance 750. The configuration 751 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls-a", etc.). The container might optionally include an operating system 778, however such an operating system need not be provided. Instead, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 776. Such a container virtual disk controller can perform any of the functions that the aforementioned CVM virtual disk controller 726, yet such a container virtual disk controller does not rely on a hypervisor or any particular operating system in order to perform its range of functions.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   dividing an address space for a copy of a source data at a second storage location into a plurality of ranges, wherein each range of the plurality of ranges corresponds to a block of data for tracking block level IO activity performed on the copy of the source data copied from a first storage location to the second storage location;
   performing a data operation to the copy of the source data at the second storage location, the data operation being performed during a periodic timeframe, wherein the data operation creates changed content in the copy of the source data that corresponds to the block of data that is tracked by a data structure that associates the changed content with the block to identify a changed block; and
   sending, from the second storage location to the first storage location, the changed content and the data structure that associates the changed content with the block corresponding to individual ones of the plurality of ranges, wherein the changed content and the data structure correspond to multiple block changes that are sent at one time rather than sending the multiple block changes one-by-one in the periodic timeframe.

2. The method of claim 1, further comprising,
   monitoring IO operations over a block of the copy of the source data to identify an occurrence of a changed block, wherein the
   data structure is updated to indicate the occurrence of the changed block.

3. The method of claim 2, wherein the monitoring is performed by a driver that runs within a guest virtual machine over a hypervisor in the second storage location, the driver configured to track block IO operations.

4. The method of claim 3, further comprising,
   constructing a snapshot based on received changed block data.

5. The method of claim 4, further comprising triggering a flush of a current block bitmap.

6. The method of claim 4, wherein constructing the snapshot is performed using a protection daemon in a control virtual machine running on hosted or on-premises equipment.

7. The method of claim 2, further comprising,
   sending changed block data only for a block that is indicated as changed in the data structure.

8. The method of claim 1, wherein the first storage location comprises on-premises equipment.

9. The method of claim 1, wherein the second storage location is a cloud-based storage facility.

10. The method of claim 1, wherein dividing the address space into the plurality of ranges comprises dividing into a plurality of 32 megabyte ranges.

11. A computer readable medium, embodied in a non-transitory computer readable medium, the non-transitory computer readable medium having stored thereon a sequence of instructions which, when stored in memory and executed by a processor causes the processor to perform a set of acts, the acts comprising:
   dividing an address space for a copy of a source data at a second storage location into a plurality of ranges, wherein each range of the plurality of ranges corresponds to a block of data for tracking block level IO activity performed on the copy of the source data copied from a first storage location to the second location;
   performing a data operation to the copy of the source data at the second storage location, the data operation being performed during a periodic timeframe, wherein the data operation creates changed content in the copy of the source data that corresponds to the block of data that id tracked by a data structure that associates the changed content with the block to identify a changed block; and
   sending, from the second storage location to the first storage location, the changed content and the data structure that associates the changed content with the block corresponding to individual ones of the plurality of ranges, wherein the changed content and the data structure correspond to multiple block changes that are sent at one time rather than sending the multiple block changes one-by-one in the periodic timeframe.

12. The computer readable medium of claim 11, further comprising instructions which, when stored in memory and executed by the processor causes the processor to perform acts of, monitoring IO operations over blocks of the copy of the source data to identify an occurrence of a changed block, wherein the data structure is updated to indicate the occurrence of the changed block.

13. The computer readable medium of claim 12, wherein the monitoring is performed by a driver that runs within a guest virtual machine over a hypervisor in the second storage location, the driver configured to track block IO operations.

14. The computer readable medium of claim 13, further comprising instructions which, when stored in memory and executed by the processor causes the processor to perform acts of, constructing a snapshot based on received changed block data.

15. The computer readable medium of claim 14, further comprising instructions which, when stored in memory and executed by the processor causes the processor to perform acts of, triggering a flush of a current block bitmap.

16. The computer readable medium of claim 14, wherein constructing the snapshot is performed using a protection daemon in a control virtual machine running on hosted or on-premises equipment.

17. The computer readable medium of claim 12, further comprising instructions which, when stored in memory and executed by the processor causes the processor to perform acts of, sending changed block data only for a block that is indicated as changed in the data structure.

18. A system comprising:

a storage medium having stored thereon a sequence of instructions; and a processor or processors that execute the instructions to cause the processor or processors to perform a set of acts, the acts comprising, dividing an address space for a copy of a source data at a second storage location into a plurality of ranges, wherein each range of the plurality of ranges corresponds to a block of data for tracking block level IO activity performed on the copy of the source data copied from a first storage location to the second location;

performing a data operation to the copy of the source data at the second storage location, the data operation being performed during a periodic timeframe, wherein the data operation creates changed content in the copy of the source data that corresponds to the block of data that is tracked by a data structure that associates the changed content with the block to identify a changed block; and;

sending, from the second storage location to the first storage location, the changed content and the data structure that associates the changed content with the block corresponding to individual ones of the plurality of ranges, wherein the changed content and the data structure correspond to multiple block changes that are sent at one time rather than sending the multiple block changes one-by-one in the periodic timeframe.

19. The system of claim 18, further comprising a driver that runs within a guest virtual machine over a hypervisor in the second storage location.

20. The system of claim 18, wherein dividing the address space into the plurality of ranges comprises dividing into a plurality of 32 megabyte ranges.

* * * * *